May 22, 1951 L. C. EDWARDS 2,554,176
AIR HOSE BRACKET
Filed July 12, 1949
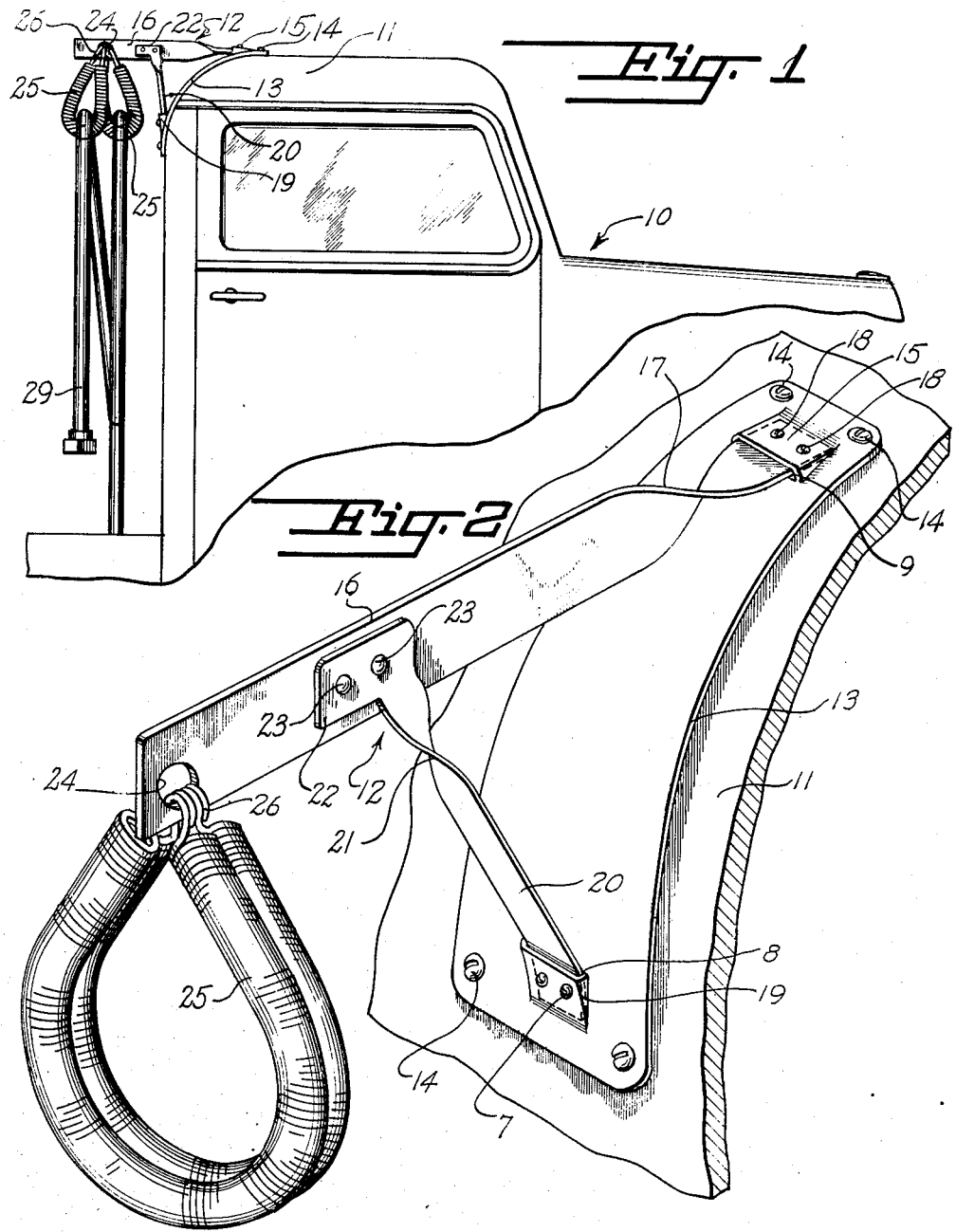
INVENTOR.
Leonard C. Edwards
BY *Victor J. Evans & Co.*
ATTORNEYS Patented May 22, 1951

2,554,176

UNITED STATES PATENT OFFICE 2,554,176

AIR HOSE BRACKET

Leonard C. Edwards, Sapulpa, Okla.

Application July 12, 1949, Serial No. 104,343

3 Claims. (Cl. 224—42.1)

This invention relates to a bracket, and more particularly to a bracket for supporting a hose.

The object of the invention is to provide a bracket which is adapted to be attached to a vehicle, such as a truck, trailer, or tractor, the bracket providing a support for an air hose.

Another object of the invention is to provide a bracket for attachment to a vehicle, the bracket serving to support an air hose in an out of the way position when not in use, and the bracket being constructed so that the hose is readily accessible when needed.

A further object of the invention is to provide an air hose supporting bracket which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a fragmentary side elevational view of a truck, with the air hose supporting bracket attached thereto, according to the present invention; and Figure 2 is an enlarged perspective view of the air hose supporting bracket.

Referring in detail to the drawings, the numeral 10 designates a vehicle, such as a truck and the truck 10 has the usual cab 11 thereon. The numeral 12 designates the bracket for supporting an air hose.

The bracket 12 includes an arcuate base 13 which has the same contour as the upper rear portion of the cab 11 and the base 13 is secured to the cab 11 by a plurality of suitable securing elements, such as screws 14, Figure 2.

Formed integral with the base 13 and projecting therefrom is a first body member 15 which is provided with an opening 9 therein. A rearwardly extending, horizontally disposed arm 16 has one of its ends projecting through the opening 9 and into the body member 15, the arm 16 being twisted as at 17. Suitable securing elements, such as rivets 18, project through the body member 15 and into engagement with the arm 16 for securing the arm 16 to the base 13.

Projecting from the base 13 is a second body member which has an opening 8 arranged therein. An upstanding brace 20 has its lower end projecting through the opening 8 and into the body member 19, there being suitable securing elements, such as rivets 7 for securing the lower end of the brace 20 to the body member 19. The brace 20 is twisted as at 21 and the upper end of the brace 20 is shaped to define a lug 22 which is arranged contiguous to the arm 16. Suitable securing elements, such as rivets 23, project through the lug 22 and into engagement with the arm 16 so that the brace 20 serves to support the arm 16.

The outer end of the arm 16 is provided with an opening 24. Suitable spring support members 25 are dependingly supported from the arm 16, there being hooks 26 projecting from the spring members 25 and into engagement with the opening 24. The air hose 29 is trained through the spring members 25 as shown in Figure 1 so that the air hose is supported in an out-of-the-way position when not in use, and the air hose 29 is readily available when needed.

What I claim:

1. A bracket for attachment to a vehicle for supporting an air hose, comprising an arcuate base having the same contour as a portion of the vehicle and secured thereto, a first body member projecting from said base, an arm having one end seated in said first body member and secured thereto, a second body member projecting from said base, a brace having its lower end seated in said second body member and secured thereto, the upper end of said brace being secured to said arm, there being an opening in the outer end of said arm, and spring members arranged in engagement with said openings for supporting the air hose.

2. In a bracket for attachment to a vehicle for supporting an air hose, a base secured to said vehicle, a first body member projecting from said base, an arm having one end seated in said first body member and secured thereto, a second body member projecting from said base, a brace havnig its lower end seated in said second body member and secured thereto, the upper end of said brace being secured to said arm, there being an opening in the outer end of said arm, and spring members arranged in engagement with said opening for supporting the air hose when in use.

3. In a bracket for attachment to a vehicle, a base secured to said vehicle, a first body member projecting from said base, an arm secured to said first body member, a second body member projecting from said base, a brace secured to said second body member, the upper end of said brace being secured to said arm, there being an opening in said arm, and spring support members arranged in engagement with said opening.

LEONARD C. EDWARDS.

REFERENCES CITED

The following references are of record in the file of this patent:

FOREIGN PATENTS

| Number | Country | Date |
|--------|---------|------|
| 97,741 | Austria | Mar. 15, 1924 |